United States Patent [19]

Bula

[11] 4,193,571

[45] Mar. 18, 1980

[54] SUSPENSION SYSTEM

[75] Inventor: Karl Bula, Seuzach, Switzerland

[73] Assignee: Sulzer Brothers Limited, Winterthur, Switzerland

[21] Appl. No.: 845,783

[22] Filed: Oct. 26, 1977

[30] Foreign Application Priority Data

Oct. 28, 1976 [CH] Switzerland ............. 13585/76

[51] Int. Cl.² .......................................... B42F 13/00
[52] U.S. Cl. ...................................... 248/343; 52/39
[58] Field of Search ................ 248/343, 317, 58, 59, 248/62; 52/39; 137/357

[56] References Cited

U.S. PATENT DOCUMENTS

| | | |
|---|---|---|
| 649,270 | 5/1900 | Collins .................... 248/59 |
| 706,903 | 8/1902 | Crawford ................. 248/62 |
| 2,463,047 | 3/1949 | Naysmith et al. ......... 248/343 X |
| 3,614,046 | 10/1971 | Lehman .................. 248/343 |

FOREIGN PATENT DOCUMENTS 2541967 3/1977 Fed. Rep. of Germany ............ 248/62

*Primary Examiner*—J. Franklin Foss
*Attorney, Agent, or Firm*—Kenyon & Kenyon

[57] ABSTRACT

The suspension system is formed of a holder and a support member which is locked in the holder. The holder has a pair of shaped apertures which are disposed in opposed parallel relation which serve to receive constricted portions of the support member. The support member is fitted longitudinally into the apertures of the holder.

12 Claims, 5 Drawing Figures

SUSPENSION SYSTEM

This invention relates to a suspension system and more particularly to a ceiling or wall mounting for fittings, pipe lines, conduits and the like.

As is known, various types of suspension systems have employed holders which can be fixed on a ceiling or wall and which have at least two apertures to receive and mount a supporting member. Generally, these apertures are situated opposite to one another and have a constricted section and a widened section to receive the supporting member. However, in some cases, these suspension systems have not permitted rapid and simple fitting of fittings, pipe lines, conduits and the like nor have these suspension systems permitted rapid dismantling of a fitted object. Further, in some cases, simple adjustments in the mounting, for example of a pipe line, cannot be made either during or after establishment of a fitting.

Accordingly, it is an object of this invention to provide a suspension system which permits rapid and simple fitting and dismantling of fittings, pipe lines and conduits. It is another object of the invention to provide a suspension system which is capable of rapid dismantling without the use of tools.

It is another object of the invention to permit simple adjustments or displacements of a pipe line in a suspension system.

The invention provides a suspension system which is comprised of a holder which is adapted to be fixed to one of a wall and a ceiling and a support member which is adapted to be fitted into the holder. The holder is provided with at least two apertures which are disposed in opposition to each other and which each have a constricted section and a widened section. The support member has a widened portion which is sized to pass longitudinally through a widened section of one of the apertures in the holder as well as a constricted portion which is sized to fit transversely into the constricted section of the aperture in order to lock the support member in the holder. Usually, the support member has a pair of such constricted portions disposed in longitudinally spaced relation in order to lock the support member in the holder.

In one embodiment, the support member is formed of a straight cylindrical bar having a pair of circumferential grooves to define the constricted portions. In another embodiment, the support member has a U-shaped bend in a middle portion. Alternatively, the support member may be a cylindrical bar having a pair of flanges and/or pins forming the widened sections.

The holder may be formed as a U-shaped yoke having a pair of lugs which extend in parallel relation to each other with an aperture in each. Such a yoke may also have a pair of parallel flanges disposed between the lugs to one or both sides of the yoke.

In another embodiment, the holder may have a curvilinear plate with a pair of parallel lugs extending therefrom in transverse relation. Again, each lug has a shaped aperture to receive the support member. Such a holder may also have a curvilinear flange or rim about the plate in order to define a pot-shape recess. In addition, a disc of sound-attenuating material may also be disposed in the pot-shaped recess.

In still another embodiment, the holder may have a curvilinear plate with a curvilinear flange or rim in which the mountings apertures are formed.

The suspension system may be readily used to suspend a ventilation ducting suspension.

In use, the support member is first introduced longitudinally, i.e. in the direction of its length, with the widest portion into the widened sections of the respected apertures of the holder. Thereafter, the support member is moved transversely into the constricted sections of the apertures. The interengagement of the constricted portions of the support member in the constricted sections of the apertures thus forms a locked connection between the support member and holder.

The suspension system allows the support member to be removed only if the support member is simultaneously or successively in alignment with the apertures of the holder. The resulting locking of the support member insures against vibration and shaking. As soon as the support member is in a position of non-alignment with the apertures, for example, in a slightly inclined position, it is impossible to remove the support member. This provides an additional locking effect.

These and other objects and advantages of the invention will become more apparent from the following detailed description taken in conjunction with the accompanying drawings in which.

Figure 1:
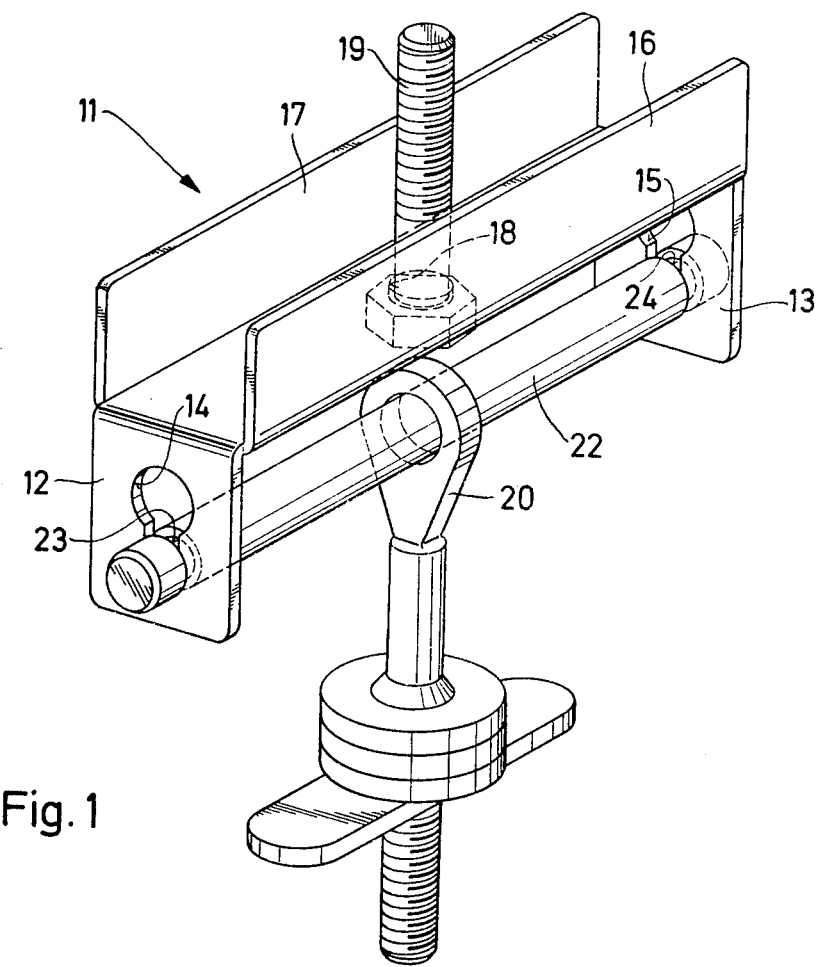
FIG. 1 illustrates an elevational view of a suspension system according to the invention in combination with a ventilation ducting suspension.

Referring to FIG. 1, the suspension system is comprised of a holder 11 which is adapted to be fixed to a wall or ceiling and a support member 22. As shown, the support member 22 has a ventilation ducting suspension suspended therefrom. This suspension includes a suitable suspension bolt 20 which can be disposed on the support member 22.

The holder 11 is in the form of a U-shaped yoke having a pair of lugs 12, 13 which extend outwardly in parallel relation. Each of these lugs 12, 13 has an aperture 14, 15 of keyhole-shape. As shown, the apertures 14, 15 are disposed in opposition to each other and each has a constricted section and a widened section above the constricted section. In addition, the yoke has a pair of parallel flanges 16, 17 between the lugs 12, 13 which extend in an opposite direction from the lugs 12, 13. In addition, the yoke is provided with a bore 18 through which a fixing screw or bolt 19 passes to secure the holder 11 in a wall or ceiling.

The support member 22 is in the form of a cylindrical bar having a pair of circumferential grooves 23, 24 disposed in longitudinally spaced relation. As shown in FIG. 1, the grooves 23, 24 are disposed in alignment with the constricted sections of 14, 15.

Figure 2:
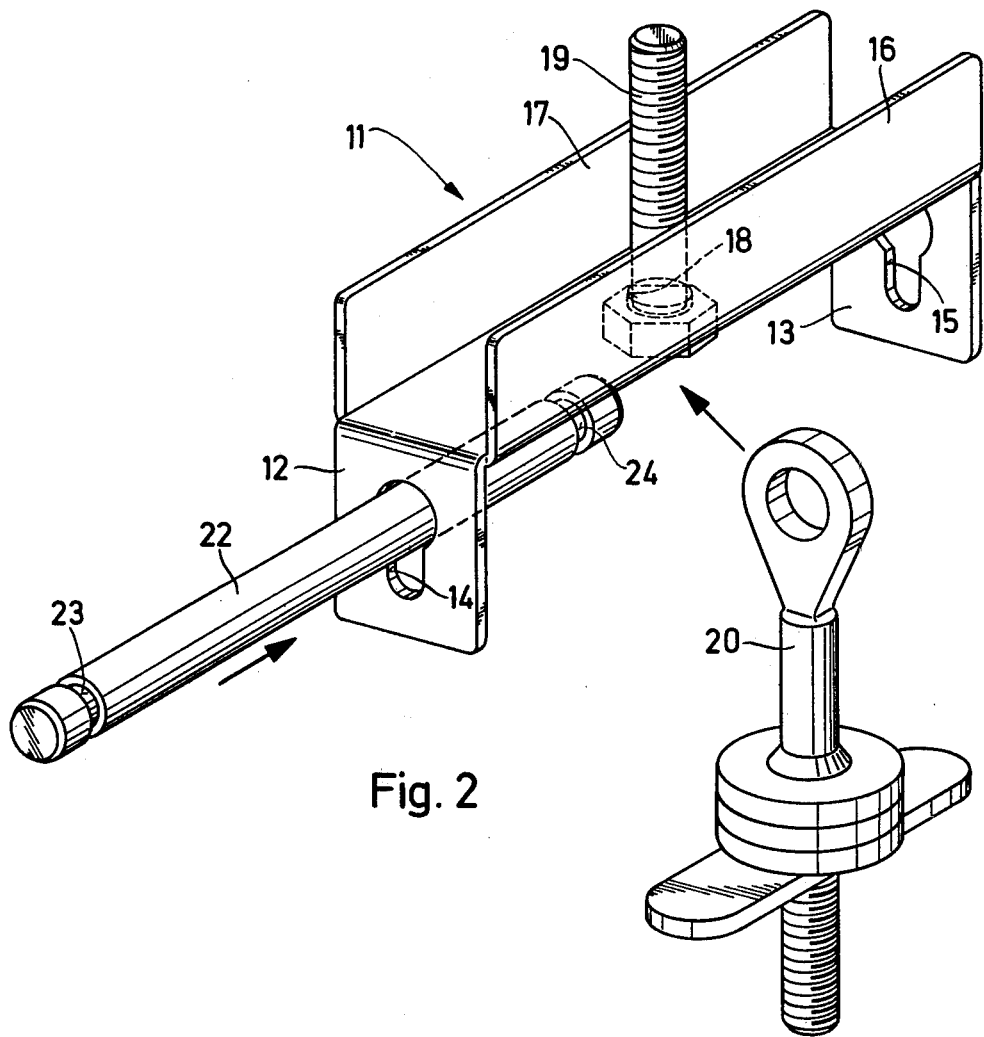
FIG. 2 illustrates the suspension of FIG. 1 during assembly.

Referring to FIG. 2, in order to mount the ventilation ducting suspension, the support member 22 is fitted into one aperture, for example, aperture 14. The support member 22 is then slid laterally from the outside through the widened portion of the aperture 14 to a point between the lugs 12, 13. The suspension bolt 20 of the ventilation ducting suspension is then slipped over the support member 22. Thereafter, the support member 22 is advanced into and through the other aperture 5. The grooves 23, 24 of the support member 22 are then aligned with the constricted sections of the apertures 14, 15 and the member 22 moved transversely into these constricted sections to lock the member 22 to the holder 11. Alternatively, the suspension bolt 20 may first be fitted onto the support member 22 and the support member 22 then guided together with the suspension bolt 20 between the lugs 12, 13. Thereafter, the support 22 can be introduced at one end into one aperture 14 by a slight inclining of the support member 22 and then moved out of the inclined position into a position in line with the widened portion of the opposite aperture 15. Thereafter, the second end of the support member 22 can be introduced into the aperture 15 to align the grooves 23, 24 with the constricted sections of the apertures 14, 15. The member 22 is then moved transversely into the locked position.

Dismantling of the support member 22 from the holder 11 is carried out in a reverse sequence. In this case, the two grooved ends of the support member 22 are first lifted from the constricted sections of the apertures 14, 15 into the widened sections. Thereafter, the support member 22 can be removed.

Figure 3:
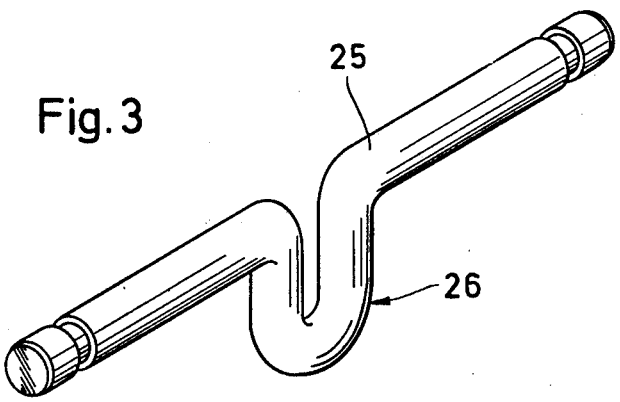
FIG. 3 illustrates a modified supporting member in accordance with the invention.

Alternatively, as shown in FIG. 3, the support member 25 may be constructed with a U-shaped bend 26 in a middle portion thereof. This support member 25 can be used when a lateral adjustment of the suspension bolt 20 (FIG. 2) is not required. Of course, the support member 22 may have a plurality of U-shaped bends if, for example, a number of fixing bolts, fixing cables and the like are provided in side-by-side relation. Also, instead of having grooves, the widened portion of the support member may be in the form of flanges and/or pins which fit into the apertures of the holder and serve to lock the support member in the holder.

Figure 4:
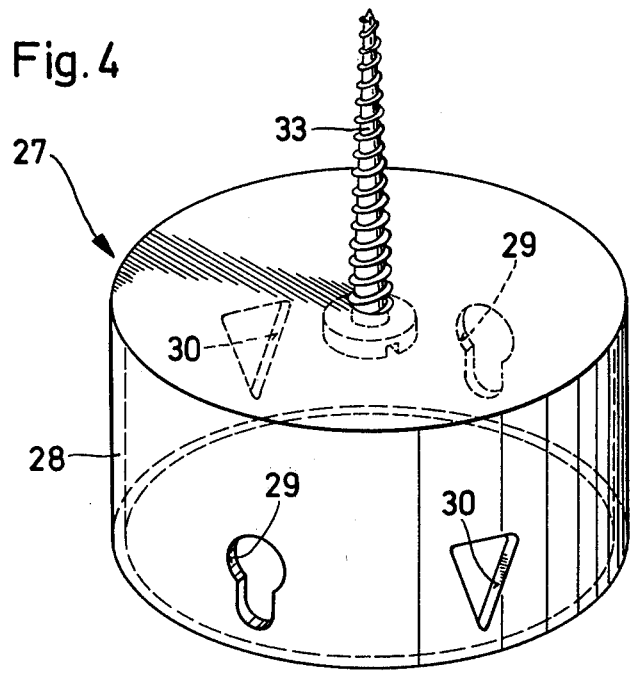
FIG. 4 illustrates a modified holder with differential types of openings in accordance with the invention.

Referring to FIG. 4, the suspension system may also use a holder 27 which includes a curvilinear circular or elliptical plate having a circular or elliptical flange or rim 28 which defines a pot-shape recess. In this case, two pairs of apertures 29, 30 can be disposed in the cylindrical flange 28, for example by punching. As shown, one pair of apertures 29 is of keyhole shape while the other pair of apertures 30 is of triangular shape. In either case, a holder, such as a holder described above, can be fitted into the apertures 29, 30. The suspension system also has a fixing screw 33 which passes through the circular plate. In order to facilitate the assembling of the suspension system, the fixing screw 33 can be rigidly connected to the holder 27. In this case, the holder 27 and fixing screw 33 form an integral element which can be screwed directly into a wall or ceiling by means of a screw-driving tool.

Figure 5:
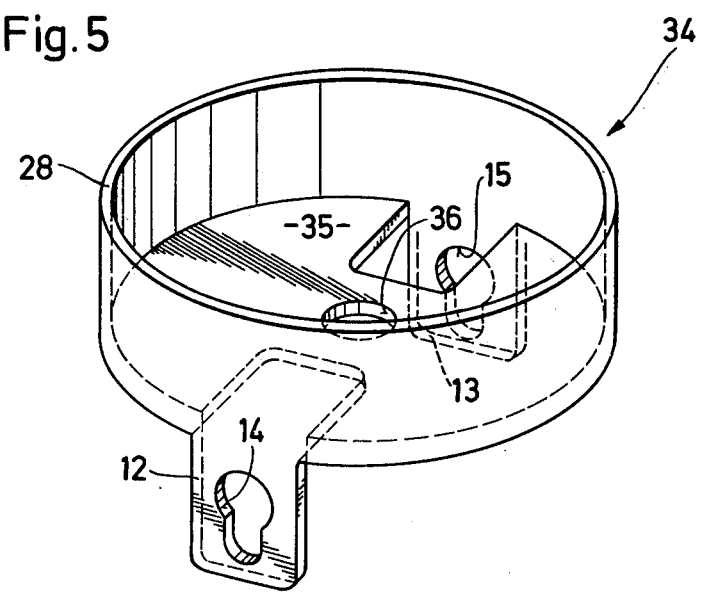
FIG. 5 illustrates a further modified holder in accordance with the invention.

Referring to FIG. 5, wherein like reference characters indicate like parts as above, the holder 34 may be provided with a pot-shape recess 35 directed towards a ceiling or wall. In this case, a disc (not shown) of sound-attenuating material such as foam material, rubber, and the like, can be disposed in the recess 35. Further, the bore 36 for a fixing screw or the like can be formed of a diameter such that the fixing bolt does not come into contact with the wall of the bore 36. To this end, a second disc of sound-attenuating material may also be provided on the opposite side of the bore 36 from the recess 35.

What is claimed is:
1. A suspension system comprising
a one part holder adapted to be fixed to one of a wall and a ceiling, said holder having at least two apertures therein disposed in opposition to each other; each said aperture having a constricted section and a widened section above said constricted section; and
a support bar having a widened portion sized to pass longitudinally through a widened section of one of said apertures and a constricted portion sized to fit transversely into said constricted section of said one aperture to lock said support member in said holder.

2. A suspension system as set forth in claim 1 wherein said support bar has a pair of said constricted portions disposed in longitudinally spaced relation.

3. A suspension system as set forth in claim 2 wherein said support bar is cylindrical and has a pair of circumferential grooves defining said constricted portions.

4. A suspension system as set forth in claim 3 wherein said bar has a U-shaped bend in a middle portion thereof.

5. A suspension system as set forth in claim 2 wherein said support member is a cylindrical bar having a pair of flanges forming widened sections.

6. A suspension system as set forth in claim 2 wherein said holder is a U-shaped yoke having a pair of lugs extending in parallel relation, each said lug having a respective one of said apertures therein.

7. A suspension system as set forth in claim 6 wherein said yoke has a pair of parallel flanges disposed between said lugs.

8. A suspension system as set forth in claim 2 wherein said holder includes a curvilinear plate having a pair of parallel lugs extending therefrom in transverse relation, each said lug having a respective one of said apertures therein.

9. A suspension system as set forth in claim 8 wherein said holder further includes a curvilinear flange about said plate to define a pot-shape recess.

10. A suspension system as set forth in claim 9 which further comprises a disc of sound-attenuating material in said recess.

11. A suspension system as set forth in claim 9 wherein said apertures are disposed in said flange.

12. In combination,
a one part holder adapted to be fixed to one of a wall and a ceiling, said holder having at least two apertures therein disposed in opposition to each other; each said aperture having a constricted section and a widened section above said constricted section;
a support bar having a widened portion sized to pass longitudinally through a widened section of one of said apertures and a constricted portion sized to fit transversely into said constricted section of said one aperture to lock said support member in said holder; and
a ventilation ducting suspension suspended from said support bar.

* * * * *

UNITED STATES PATENT AND TRADEMARK OFFICE
CERTIFICATE OF CORRECTION

PATENT NO. : 4,193,571
DATED : March 18, 1980
INVENTOR(S) : Karl Bula

It is certified that error appears in the above—identified patent and that said Letters Patent is hereby corrected as shown below:

Column 2, line 32, "differential" should be --different--.

Column 3, line 1, "5" should be --15--.

Column 4, line 21, "cylindrical and has" should be --cylindrical shape having--.

Column 4, line 27, "members is a cylindrical bar having" should be --bar is cylindrical and has--.

Signed and Sealed this

Fifth Day of August 1980

[SEAL]

Attest:

SIDNEY A. DIAMOND

*Attesting Officer*     *Commissioner of Patents and Trademarks*